United States Patent
Gehring et al.

(10) Patent No.: US 7,051,335 B2
(45) Date of Patent: May 23, 2006

(54) SYNCHRONIZATION OF APPLICATIONS IN DISTRIBUTED SYSTEMS USING AN ASYNCHRONOUS COMMUNICATION CHANNEL

(75) Inventors: Hubert Gehring, Nuremberg (DE); Reiner Plaum, Erlangen (DE); Thomas Talanis, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 323 days.

(21) Appl. No.: 10/026,553

(22) Filed: Dec. 27, 2001

(65) Prior Publication Data

US 2002/0087742 A1   Jul. 4, 2002

Related U.S. Application Data

(63) Continuation of application No. PCT/DE00/02106, filed on Jun. 28, 2000.

(30) Foreign Application Priority Data

Jun. 30, 1999   (DE) ................ 199 29 751

(51) Int. Cl.
*G06F 3/00*   (2006.01)
(52) U.S. Cl. .............. 719/315; 719/313; 719/314; 719/316; 719/330
(58) Field of Classification Search ............... 709/310; 719/313, 314, 315, 316, 330
See application file for complete search history.

(56) References Cited

U.S. PATENT DOCUMENTS 5,860,010 A * 1/1999 Attal ..................... 717/137
6,148,290 A * 11/2000 Dan et al. .................. 705/1
6,430,570 B1 * 8/2002 Judge et al. ............ 707/103 R
6,587,122 B1 * 7/2003 King ......................... 345/708

FOREIGN PATENT DOCUMENTS

| JP | 05-290003 | 11/1993 |
|----|-----------|---------|
| JP | 09-330287 | 12/1997 |
| WO | WO 98/02809 A1 | 1/1998 |

OTHER PUBLICATIONS

David D.H.Lin et al "An Asynchronous Remote Procedure Call System for Heterogeneous Programming",, 1991 Conference Proceedings—Phoenix Conference on Computers and Communications, Mar. 1991, pp. 153-159.
Yen-Min Huang, et al "URPC: A Toolkit for Prototyping Remote Procedure Calls", The Computer Journal, vol. 39, No. 6, Jan. 1996.
English translation of Japanese Office Action dated Oct. 20, 2005.

* cited by examiner

*Primary Examiner*—Nabil El-Hady
(74) *Attorney, Agent, or Firm*—Sughrue Mion, PLLC

(57) ABSTRACT

A system and a method for transmitting data between a local data processing system and a remote data processing system through an asynchronous transmission channel. To ensure synchronization between a local and a remote data processing device, it is proposed that when a first program of the local data processing device sends a call, such as a RPC (Remote Procedure Call) to a second program of the remote data processing device, at least one predefinable parameter of the data to be transmitted is stored in the local data processing device. When the remote data processing device sends a response to the local data processing device, the predefinable parameter is provided to identify and/or synchronize the response in the first program.

27 Claims, 2 Drawing Sheets

SYNCHRONIZATION OF APPLICATIONS IN DISTRIBUTED SYSTEMS USING AN ASYNCHRONOUS COMMUNICATION CHANNEL

This is a Continuation of International Application PCT/DE00/02106, with an international filing date of Jun. 28, 2000, which was published under PCT Article 21(2) in German, and the disclosure of which is incorporated into this application by reference.

FIELD OF THE INVENTION

The invention relates generally to a system and method in the area of data transmission in an automated technical plant having distributed objects. In particular, the invention relates to a data transmission system method in which data is transmitted between a user program and a server program.

BACKGROUND OF THE INVENTION

A control mechanism for support in a heterogeneously distributed programming environment is disclosed in David D. H. Lin, Behrooz Shirazi & Hassan Peyravi, *An Asynchronous Remote Procedure Call System for Heterogeneous Programming*, Proceedings of the Annual International Phoenix Conference on Computers and Communications, U.S. Los Alamitos, IEEE Comp. Soc. Press, Vol. Conf. 10, Mar. 27, 1991 (1991-03-27), pp. 153–159, XP000299042 ISBN: 0-8186-2133-8 (hereinafter "Lin et al."). The Lin et al. mechanism is based on an asynchronous control algorithm for assigning a plurality of responses of a server to queries from a client.

In Lin et al., a method is disclosed in which a time-stamped unique process ID is used to keep track of Remote Procedure Calls (RPCs) and responses thereto. A Remote Procedure Call is a protocol that one program can use to request a service from a program located in another computer in a network without having to understand network details. The RPC protocol uses the "client/server" model. The requesting program is a "client" and the service-providing program is the "server". Like a regular or local procedure call, a RPC is typically a synchronous operation requiring the requesting program to be suspended until the results of the remote procedure are returned. However, the use of lightweight processes or "threads" that share the same address space allows multiple RPCs to be performed concurrently.

The unique process ID disclosed in Lin et al. is a concatenation of machine-ID, program-ID, dependency-ID and a local time-stamp. The unique process-IDs provide a mechanism to issue certain types of RPCs asynchronously, but process their replies in correct, i.e., synchronous, order.

Additionally, in accordance with the Lin et al. method, three different data structures are used to implement the required control mechanism over the RPCs. The three data structures respectively deal with incoming calls, out-going calls and replies that need to be held for later processing.

A client device, e.g., the device originating an RPC, processes calls and receives messages in an asynchronous fashion. To process RPCs, the client generates a header for each individual call and puts the header on the queue for out-going calls. The header contains the process-ID generated by the client and is used for claiming the reply and for ultimately keeping the desired order of the replies.

When a client processes a received message, it first places the message on a buffer. The client then tries to match the header of the incoming call with the headers in the queue for out-going calls. If there are some headers with the same machine-ID, program-ID and dependency-ID but have a smaller timestamp than the timestamp of the incoming call, the client indicates that there are some RPC replies that have not yet returned and need to be processed before the incoming call can be processed. In this case, the reply is removed from the queue for out-going calls. The desired processing order of the replies is maintained by matching the IDs and comparing the timestamp of each header. The unprocessed replies in the buffer are checked every time a new message is received.

In the server, messages are received, calls are dispatched and results are sent back to the client. The header for an incoming call is put on the queue dedicated for incoming calls. In the meantime, the server resets a timeout condition and prepares for the next incoming message. This monitoring operation continues until the timeout condition is reached. By the time the server stops monitoring the incoming messages on its communication port, control is switched over to the server dispatcher for dispatching the calls on the queue for incoming calls. As soon as the procedure is completed, the result is attached to the corresponding header in the queue for incoming calls and is sent back to the client. After the result is sent, the header of the call in the queue for incoming calls is removed from the queue.

However, the Lin et al. system and method requires much overhead in the processing of RPCs. Thus, a method is desired that would simplify the solicitation and response of RPCs.

OBJECTS OF THE INVENTION

One object of the present invention is to provide an asynchronous communication system between two processing devices over a network. In particular, in accordance with the invention, a simple but reliable method is proposed in which synchronization of applications in distributed systems is achieved by using an asynchronous communication channel.

SUMMARY OF THE INVENTION

The invention relates to a system and a method for transmitting data between a local data processing system and a remote data processing system through an asynchronous transmission channel. Such a system is used, for instance, in the field of automation technology for operating and monitoring programmable controllers, such as stored-program controllers, numerical controls and/or drives.

According to the invention, the objects mentioned above as well as others are achieved by providing a system for transmitting data between a local data processing system and a remote data processing system through an asynchronous transmission channel. The system utilizes a memory for storing at least one predefinable parameter provided for identifying a call of a first program of the local data processing device, such as a client or user program, sent to a second program of the remote data processing device, such as a server program. A predefinable parameter is also provided that is contained in a response of the remote data processing device to the local data processing device for identifying and/or synchronizing the response in the first program.

The method serves to transmit data between a local data processing system and a remote data processing system through an asynchronous transmission channel. When a first program of the local data processing device, particularly a user program, sends a call to a second program of the remote data processing device, particularly a server program, a predefinable parameter provided for identifying a call is stored. In a response sent by the remote data processing device to the local data processing device, a second predefinable parameter for identifying and/or synchronizing the response of the first program is transmitted from the remote data processing device to the local data processing device, where it is evaluated.

Data transmission from the local data processing system to the remote data processing system takes place through an asynchronous transmission channel. Therefore, upon receipt from the remote data processing system, the response data has to be matched and/or synchronized with the proper request. For this identification and/or synchronization of the response data, at least one predefinable parameter provided for identifying the call of a first program sent to a second program is stored in the local data processing device. The predefined parameter is integrated into the response data, which is returned by the remote data processing device to the local data processing device and is detected again in the local data processing device. This ensures simple identification and synchronization of the response data in the user program of the local data processing device.

Reliable identification of the response(s) and thus assignment and synchronization of the programs can be achieved by providing the system with means for comparing the stored parameter and the predefinable parameter contained in the response.

The predefined parameter can be implemented and configured with little complexity if the predefinable parameter is formed at least from parts of the IDL (Interface Definition Language) transmitted from the first program to the second program.

One advantageous application in accordance with the present invention relates to the use of the system in the field of automation technology with distributed systems, for example, DCOM (Distributed Component Object Modeling) systems.

BRIEF DESCRIPTION OF THE DRAWINGS

The invention will now be described in greater detail with reference to the drawing figures in which.

DETAILED DESCRIPTION OF THE PREFERRED EMBODIMENTS

Figure 1:
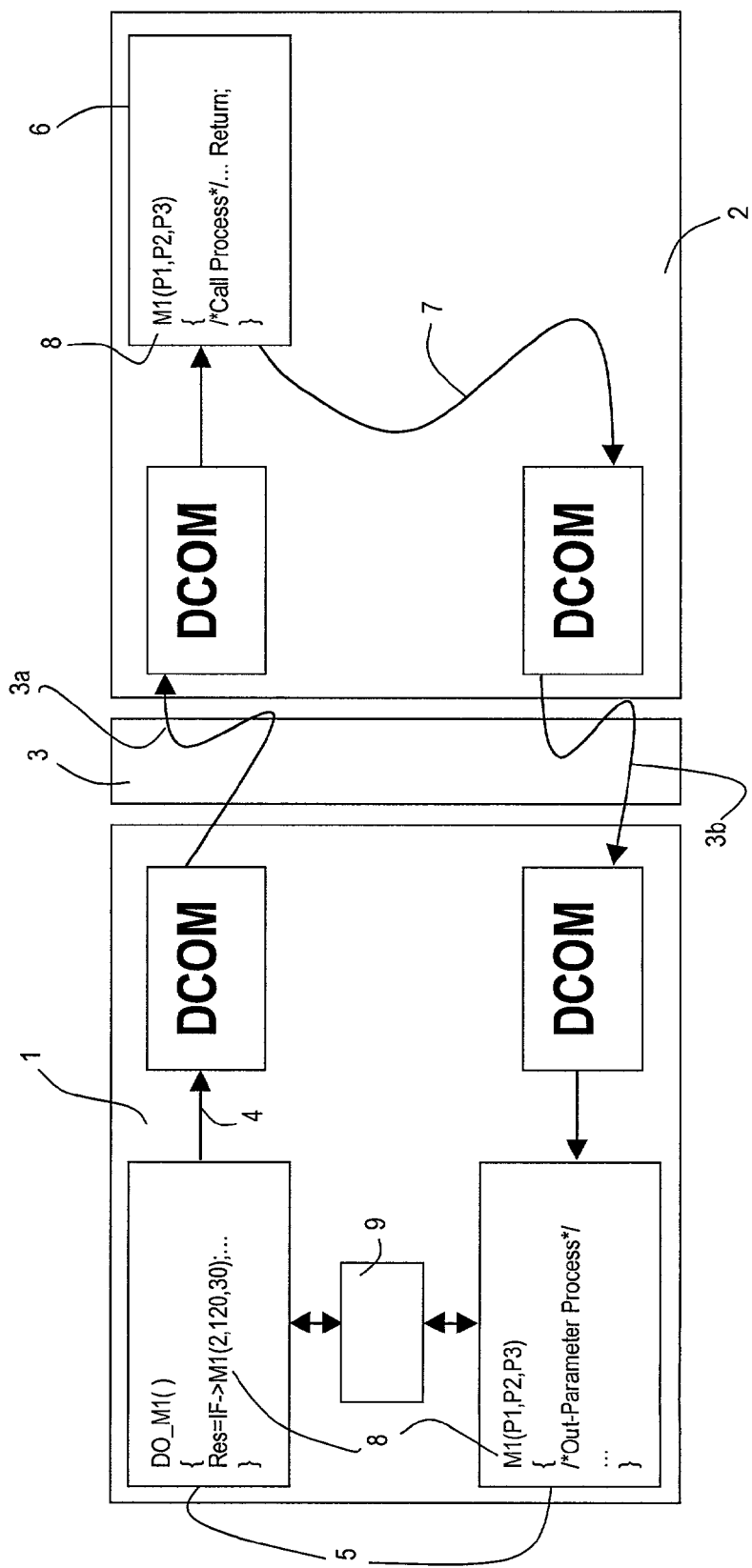
FIG. 1 is a block diagram of a first exemplary embodiment of a system, in accordance with the present invention, for transmitting data between a user program and a server program.

In accordance with the invention, FIG. 1 shows a block diagram of a first exemplary embodiment of a system for transmitting data between a user program 5 of a local data processing device 1 and a server program 6 of a remote data processing device 2. Communication between the local first data processing device 1 and the remote second data processing device 2 takes place through an asynchronous transmission channel 3. Asynchronous in this context means that the respective transmission data from the first data processing device 1 and the reception data from the second data processing device 2 are transmitted in different transmission channels without synchronization. This is graphically indicated in FIG. 1 by arrow 3a, which represents a forward channel, and arrow 3b, which represents a reverse channel. The local first data processing device 1, by way of example, shows a user program 5, which includes the solicitation of information and/or data from a server program 6 of the remote second data processing device 2. To this end, the user program 5 of the local data processing device 1 sends a call 4 to the server program 6 of the remote data processing device 2. In the exemplary embodiment depicted in FIG. 1, a parameter 8 ("M1") is used as the predefined parameter. The M1 parameter is then integrated into the response 7 sent by the remote data processing device 2 through the reverse channel 3b to the local data processing device 1, where it is further processed by the user program 5. Based on the predefinable parameter 8 ("M1") the user program 5 has a means to match each response to the corresponding call and/or synchronize each call/response pair in the user program 5. Detection and identification of the predefinable parameter 8 is made possible by temporarily storing the predefinable parameter 8 in memory 9 of the first data processing device 1.

Through the identification and synchronization of the user program 5 illustrated in FIG. 1, the user can reliably maintain a synchronous programming model, which also results in client applications that are easier to maintain. One advantageous application of the present embodiment is in regard to client applications as they relate to embedded systems, e.g., DCOM (Distributed Component Object Model) systems. DCOM is a set of Microsoft™ concepts and program interfaces in which client program objects can request services from server program objects on other computers in a network. DCOM is based on the Component Object Model (COM), which provides a set of interfaces allowing clients and servers to communicate within the same computer.

System performance particularly consists of storing the in-parameters from the stack and restoring them again prior to user callback. User callback is constructed to be identical to the original call. As a result, the client, or user, finds its in-parameters unchanged. Preferably, IDL (Interface Definition Language) is used to implement the predefinable parameter. IDL is a generic term for a language that lets a program or object written in one language communicate with another program written in an unknown language. In distributed object technology, it is important that new objects be able to be sent to any platform environment and discover how to run in that environment. An Object Request Broker (ORB) is an example of a program that might use an IDL to "broker" communication between two object programs.

An IDL works by requiring that the interfaces of a particular program be described in a stub, or slight extension of the program that is compiled into the program. The stubs in each program are used by a broker program to allow them to communicate. As a result of using the IDL to implement the predefined parameter, a simple system with little complexity is achieved.

Figure 2:
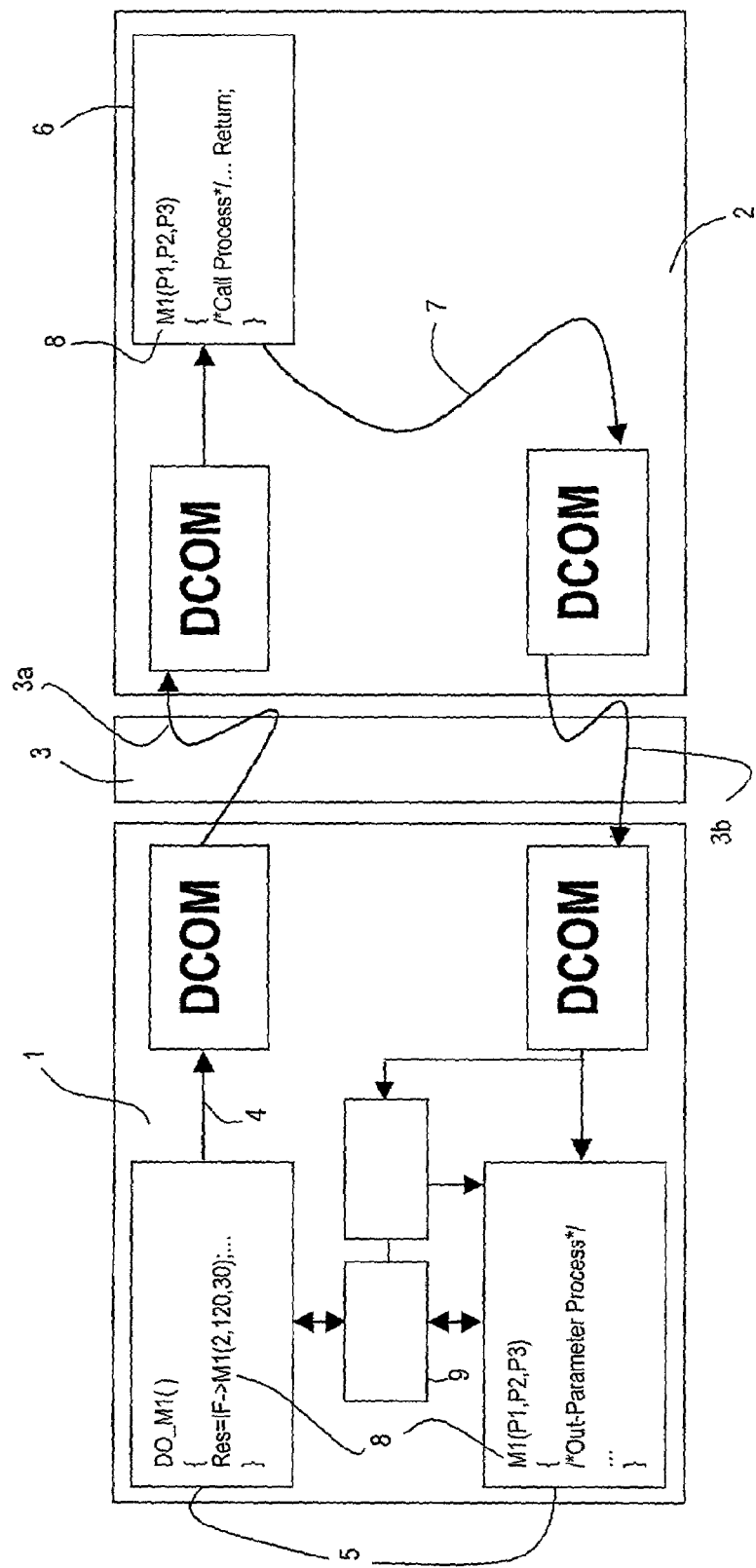
FIG. 2 is a block diagram of a second exemplary embodiment of a system, in accordance with the present invention, for transmitting data between a user program and a server program.

FIG. 2 illustrates a second exemplary embodiment of a system in accordance with the present invention. The reference numerals in FIG. 2 are essentially the same as the reference numerals shown in FIG. 1. Thus, the description above, attendant to FIG. 1, is referenced in regard to the objects in FIG. 2 that have the same reference numeral as objects in FIG. 1. However, unlike FIG. 1, in FIG. 2 a comparator 10 is provided. Comparator 10 compares the parameter data stored in memory 9 with the response data 7 transmitted by the server program 6. This comparison is used to ensure that the response 7 of the server 6 can be synchronously integrated into the user program 5 by means of the identification of parameter 8.

In summary, the invention thus relates to a system and a method for transmitting data between a local data processing system 1 and a remote data processing system 2 through an asynchronous transmission channel 3. To ensure synchronization between the local data processing device 1 and the remote data processing device 2, it is proposed that when a first program 5 of the local data processing device 1, particularly a user program, sends a call 4 to a second program 6 of the remote data processing device 2, particularly a server program, at least one predefinable parameter 8 of the data to be transmitted is stored in the local data processing device 1. When the remote data processing device 2 sends a response 7 to the local data processing device 1, the predefinable parameter is provided for identifying and/or synchronizing the response 7 in the first program 5.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A system for transmitting data between a local data processing device and a remote data processing device through an asynchronous transmission channel for use with distributed objects in the field of automation technology, said system comprising:
   a memory assigned to the local data processing device for storing at least one user-specified parameter to identify a call sent by a first program of the local data processing device to a second program of the remote data processing device to solicit data from the second program of the remote data processing device;
   means for integrating the user-specified parameter into response data sent by the remote data processing device to the local data processing device;
   means for identifying the user-specified parameter in the response data;
   means for synchronizing the response data such that by identifying the user-specified parameter in the response data, the response data of the second program of the remote data processing device is integrated into the first program of the local data processing device; and
   an asynchronous transmission channel transmitting data between the local data processing device and the remote data processing device wherein the asynchronous transmission channel comprises a forward channel forwarding data from the local data processing device to the remote data processing device and a reverse channel forwarding the data from the remote data processing device to the local data processing device, wherein the forward channel and the reverse channel are not synchronized with each other.

2. A system as claimed in claim 1, further comprising:
   means for comparing the stored specified parameter stored in said memory of the local data processing device with the user-specified parameter contained in the response data.

3. A system as claimed in claim 1, wherein the first program of the local data processing device is a user program and the second program of the remote data processing device is a server program.

4. A system as claimed in claim 1, wherein the system is used in the field of automation technology to operate and monitor programmable controllers.

5. A system as claimed in claim 4, wherein the program controllers are selected from the group comprising, stored program controllers, numerical controls and numeric drives.

6. A system as claimed in claim 1, wherein the specified parameter is formed at least from parts of the IDL (Interface Definition Language) and is transmitted by the first program to the second program.

7. A system as claimed in claim 1, wherein the system is used in connection with client applications in embedded systems.

8. A system as claimed in claim 7, wherein, the embedded systems are DCOM (Distributed Component Object Model) systems.

9. A system as claimed in claim 1, wherein the second data processing device stores the received from the first data processing device on a stack and restores the user-specified parameter before a callback is sent to the first data processing device.

10. A system as claimed in claim 1, wherein a user callback is constructed identically to an original call.

11. The system according to claim 1, wherein the forward channel functions independently from the reverse channel.

12. The system according to claim 1, wherein the local data processing device and the remote data processing device are configured to receive and send the data at the same time.

13. The system according to claim 1, wherein the call is sent separately from other calls of the local data processing device.

14. A method for transmitting data between a local data processing device and a remote data processing device through an asynchronous transmission channel for use with distributed objects in the field of automation technology, said method comprising:
   integrating a user-specified parameter into a call of a first program of the local data processing device sent to a second program of the remote data processing device via the asynchronous transmission channel to solicit data from the second program, wherein the user-specified parameter identifies the call and is stored in the first data processing device;
   integrating the user-specified parameter in the response data of the remote data processing device sent to the local data processing device via the asynchronous transmission channel in response to the call;
   identifying the response data transmitted by the remote data processing device to the local data processing device in the first data processing device by observing the user-specified parameter;
   integrating the response data by identifying the user-specified parameter into the first program of the local data processing device wherein the asynchronous transmission channel comprises a forward channel forwarding data from the local data processing device to the remote data processing device and a reverse channel forwarding the data from the remote data processing device to the local data processing device, wherein the forward channel and the reverse channel are not synchronized with each other.

15. A method as claimed in claim 14, further comprising:
comparing the parameter contained in the response data with the stored parameter.

16. A method as claimed in claim 14, wherein the user-specified parameter is formed at least from parts of the IDL (Interface Definition Language) transmitted by the first program to the second program.

17. A method as claimed in claim 14, wherein the method is used in connection with client applications in embedded systems.

18. A method as claimed in claim 14, wherein the embedded systems are DCOM (Distributed Component Object Model) systems.

19. A method as claimed in claim 17, wherein the second data processing device stores the user-specified parameter received from the first data processing device on a stack and restores the user-specified parameter before a callback is sent to the first data processing device.

20. A method as claimed claim 14, wherein a user callback is constructed identically to an original call.

21. An automation device comprising:
a local data processing device transmitting data through an asynchronous transmission channel for use with distributed objects in the field of automation technology;
a memory for storing at least one user specified-parameter to identify a call sent by a first program of the local data processing device to a second program of a remote data processing device to solicit data from the second program of the remote data processing device;
means for integrating the user-specified parameter in response data sent by the remote data processing device to the local data processing device;
means for identifying the user-specified parameter into the response data; and
means for synchronizing the response data such that by identifying the user-specified parameter in the response data, the response data of the second program of the remote data processing device is integrated into the first program of the local data processing device wherein the asynchronous transmission channel comprises a forward channel forwarding data from the local data processing device to the remote data processing device and a reverse channel forwarding the data from the remote data processing device to the local data processing device, wherein the forward channel and the reverse channel are not synchronized with each other.

22. An automation device as claimed in claim 21, further comprising:
means for comparing the parameter stored in memory of the local data processing device with the user-specified parameter contained in the response data.

23. An automation device as claimed in claim 21, wherein the first program of the local data processing device is a user program and the second program of the remote data processing device is a server program.

24. An automation device as claimed in claim 21, wherein the automation device is used in the field of automation technology to operate and monitor stored program controllers, numerical controls or numerical drives.

25. An automation device as claimed in claim 21, wherein the user-specified parameter is formed at least from parts of the IDL (Interface Definition Language) transmitted by the first program to the second program.

26. An automation device as claimed in claim 21, wherein the automation device is used in connection with client applications in embedded systems.

27. An automation device as claimed in claim 26, wherein the embedded systems are DCOM (Distributed Component Object Model) systems.

* * * * *